April 25, 1939.                L. ROBILLARD                2,156,195
                                  CLAMP
                           Filed June 25, 1937           2 Sheets-Sheet 1
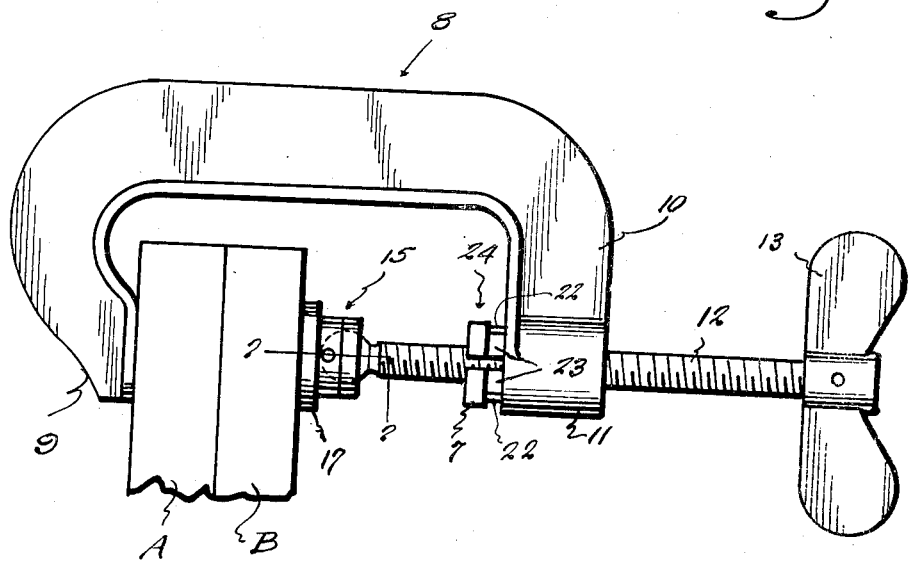
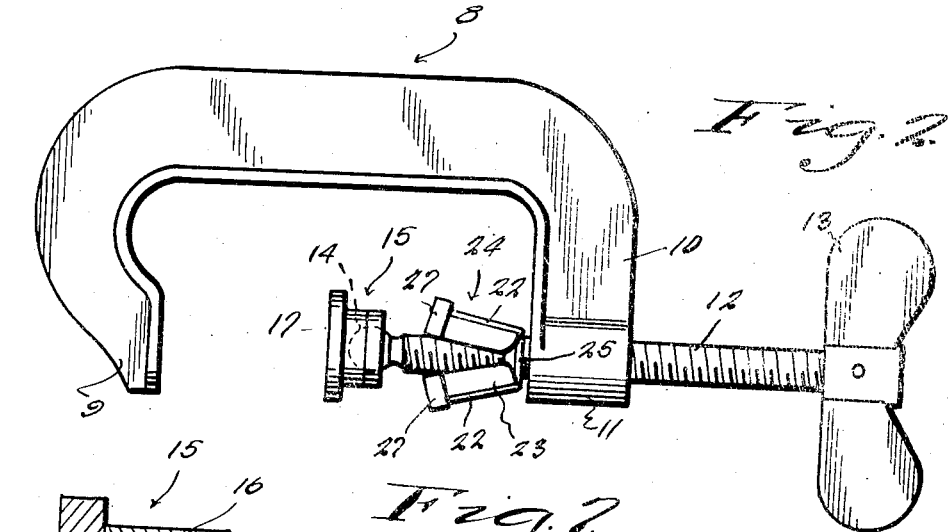
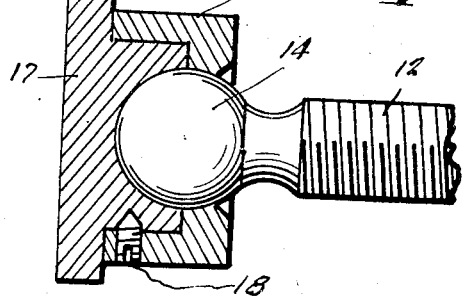
Inventor
Levis Robillard
By *Clarence A. O'Brien*
   *Hyman Berman*
                        Attorneys April 25, 1939.  L. ROBILLARD  2,156,195

CLAMP

Filed June 25, 1937  2 Sheets-Sheet 2

Inventor
Levis Robillard
By Clarence A. O'Brien
Hyman Berman
Attorneys

Patented Apr. 25, 1939

2,156,195

UNITED STATES PATENT OFFICE 2,156,195

CLAMP

Levis Robillard, Houston, Tex.

Application June 25, 1937, Serial No. 150,395

2 Claims. (Cl. 144—305)

This invention relates to an improved so-called C-clamp such as is utilized as a portable vise for joining wood parts and in other miscellaneous ways now well known to the trade, it being the purpose of the invention to provide an improved feed screw and actuating nut therefor so constructed and arranged as to materially expedite adjustment of the work gripping jaws in relation to each other.

Like my predecessors in this line of endeavor, I recognize the fact that the feed or clamping screw in the ordinary C-clamp is threaded in its bearing for slow and steady adjustment. It follows, therefore, that the relative setting of jaws for effective gripping of the parts to be joined is a time consuming and tediously slow type of operation. I am therefore sufficiently conversant with the prior field of invention to appreciate that adjustable mountings have been provided for in the frame of the clamp to expedite slidable bodily adjustment of the clamping screw.

In keeping with the principles of my improved idea, I have perfected an arrangement which, I believe, is more aptly fitted for the purposes intended, more easily used, and otherwise well constructed to do the job well and to accomplish an otherwise slow adjustment result in an appreciable and relatively faster manner.

Constructed in accordance with the improved conception with which I am here concerned, the outstanding objective is therefore the provision of a clamp which may be readily adjusted to a condition to initiate the clamping action, after which an equally quick release of the clamping action may be effected, while at the same time avoiding unnecessary wear and tear on the screw-threads or likelihood of distortion from a less efficient arrangement.

Features and advantages in addition to those above enumerated will become readily apparent from the following description and accompanying drawings.

In the drawings, wherein I use like reference characters to designate like mechanical parts:

Figure 1 is an elevational view showing the clamp as constructed in accordance with my ideas and illustrating precisely how it is used in association with the parts or work to be clamped.

Figure 2 is a view similar to Figure 1 with the tool removed from the work and showing the ingenious hand-controlled feed nut in projected and released position.

Figure 7 is an enlarged detail section on the line 7—7 of Figure 1.

Figure 3:
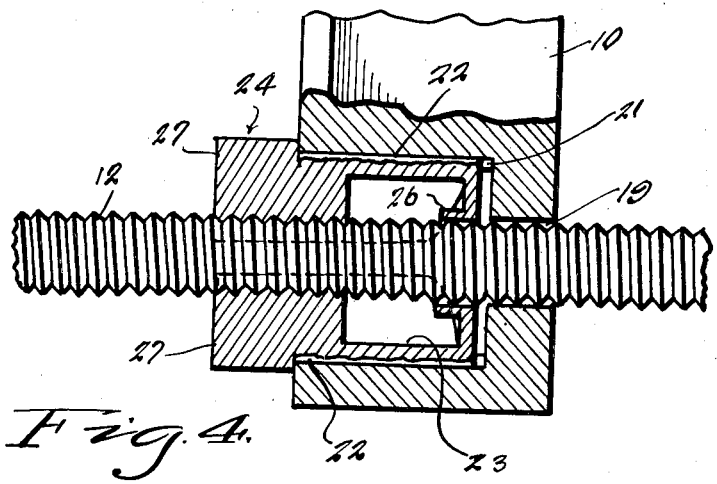
Figure 3 is an enlarged fragmentary sectional view showing the coaction of the feed nut with its accommodation socket in the clamp frame.

Referring now to the drawings by reference numerals, it will be observed that the C-shaped frame is denoted, as a unit, by the numeral 8. At one end is the customary stationary work engaging jaw 9. Parallel to this and at the opposite end is a complemental arm 10 terminating in an eye or bearing 11 to accommodate the feed screw 12, said screw being provided with a wing nut or equivalent grip 13 for convenient operation. As seen in Figure 7, the inner end of the feed screw terminates in a ball head 14 having a swivel work engaging relatively movable jaw unit 15 mounted thereon. The swivel jaw unit 15 comprises a retention and coupling cup 16 telescopically receiving the shank of the abutment disk 17, the parts being held separately together by a readily accessible joining or set screw 18. This permits proper adaptation of the unit 15 in relation to the parts A and B of the work. It also renders said part 15 readily reparable.

Figure 4:
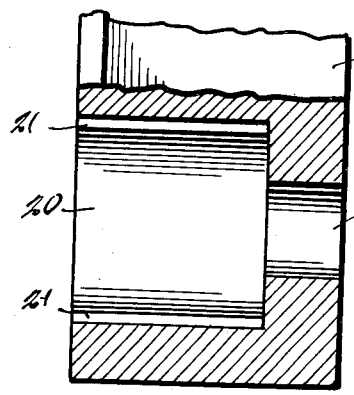
Figure 4 is a view similar to Figure 3 with the nut and feed screw removed to expose the socket construction.
Figure 6:
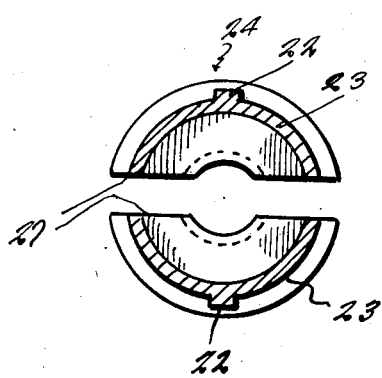
Figure 6 is a section on the line 66 of Figure 5.

Attention now comes to Figure 4, wherein the numeral 19 designates a smooth walled guide hole for the threaded screw 12. The diameter of this is slightly larger than the diameter of the feed screw, as is obvious. Moreover, it registers or communicates with a counter socket 20 having diametrically opposed grooves forming keyways 21 to accommodate complemental keys 22 on the companion parts 23 of the hand adjusted feed nut 24. The nut embodies a carrier ring or mounting 25 which slips into the socket, this having a concentric guide bushing or annulus 26 registerable with the screw hole 19. The jaw parts of the nut 23 are joined to the peripheral edge of the supporting disk 25 by spring connection. The spring action normally separates the jaws, as is obvious. The jaws themselves are denoted by the numerals 27, the same being segmental in form and provided with screw-threads, as indicated in Figure 6, to coact with the threads on the feed screw.

Manifestly, the nut 24 slips into and out of the accommodation socket 20. When in the socket, as seen in Figure 3, the ribs or keys 22 slip into the keyways 21 to prevent rotation of the nut. It then becomes a feed bushing for the screw 12 which threads through it, as is obvious. The parts 26 and 19, as before indicated, are non-threaded or plain surfaced and of sufficient diameter not to interfere with the free sliding and rotation of the feed or clamping screw.

When the nut is released from the socket, as seen in Figure 2, it is obvious that the feed screw can be bodily slipped through the frame to bring the movable work engaging jaw 15 into proper spaced relation with respect to the complemental fixed jaw 9. This allows the initial adjustment to be made rapidly. Then the feed and retaining nut is slipped into the socket to the position seen in Figure 3, this being done by hand, whereupon the spring segments 23 approach each other and bring the threads on the segments 27 into effective engagement with the threads of the clamping or feed screw 12. At this time the action is such as would be the case if the nut were permanently mounted in the frame to function as a regular guide eye or bushing. It is also obvious that when pressure is withdrawn or relieved, the nut can be readily slipped out of the adapter socket to permit subsequent adjustment to be accurately and quickly made.

Figure 5:
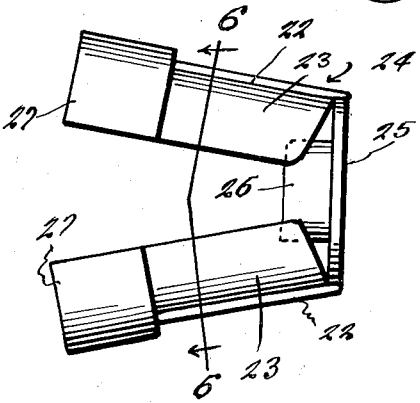
Figure 5 is an elevational view of the improved nut per se.

Manifestly, the novelty resides in the special sectional spring-type nut 24 seen in Figure 5 coacting with the especially constructed adapter socket 21 in the frame, whereby to promote the aforementioned quick adjustment of the clamping screw. Additional novelty resides, it is believed, in the swivel sectional reparable abutment unit 15 seen in Figure 7.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

1. As a new article of manufacture and as a component part of a clamp of the class described, a unitary one-piece feed nut adapted to slide into a socket and accommodate a clamping feed screw and comprising a rigid annulus having a concentric centrally disposed annular collar adapted to permit passage therethrough of said feed screw, a pair of duplicate companion diametrically opposed jaw members yieldably attached at corresponding inner ends to the peripheral portion of said annulus and projecting laterally therefrom in coacting relationship with respect to said collar, the free ends of said jaws being provided with integral and segmental coacting members and said members being screw threaded and cooperating in providing a split feed nut in axial alignment with said collar.

2. In a construction of the class described, a C-shaped frame, one end thereof terminating in a relatively fixed work engaging jaw, the opposite end being provided with a relatively small feed screw hole non-threaded, and being further provided with a smooth walled socket in communication with said feed screw hole, said socket being of a diameter greater than the hole to accommodate a bodily insertable and removable feed nut, diametrically opposite portions of said socket being provided with grooves constituting keyways, a feed nut fitting in said socket, said nut comprising a carrier ring having a central annular collar in alignment with said feed screw hole, a pair of resilient members attached to said carrier ring and projecting laterally therefrom and terminating at their free ends in segmental screw threaded nut forming portions, said members being provided with ribs forming keys fitting removably in said keyways.

LEVIS ROBILLARD.